US007898955B1

(12) United States Patent
Wang et al.

(10) Patent No.: US 7,898,955 B1
(45) Date of Patent: Mar. 1, 2011

(54) SYSTEM AND METHOD FOR REAL-TIME DIAGNOSIS OF ROUTING PROBLEMS

(75) Inventors: Jia Wang, Randolph, NJ (US); Oliver Spatscheck, Randolph, NJ (US); Lixin Gao, Amherst, MA (US); Feng Wang, Amherst, MA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 782 days.

(21) Appl. No.: 11/451,261

(22) Filed: Jun. 12, 2006

(51) Int. Cl.
*G06F 11/00* (2006.01)
*H04L 12/28* (2006.01)
*H04L 12/56* (2006.01)

(52) U.S. Cl. ............... 370/235; 370/392; 370/395.21; 370/401

(58) Field of Classification Search .......... 370/216–401, 370/465–469; 714/748; 709/212–230
See application file for complete search history.

(56) References Cited

U.S. PATENT DOCUMENTS

| 6,115,393 | A * | 9/2000 | Engel et al. ............... 370/469 |
| 7,564,792 | B2 * | 7/2009 | Singh et al. ............... 370/236 |
| 2005/0232227 | A1 * | 10/2005 | Jorgenson et al. ......... 370/351 |
| 2006/0077978 | A1 * | 4/2006 | Sprague et al. ............ 370/392 |
| 2006/0159011 | A1 * | 7/2006 | Dalal et al. ............... 370/220 |

OTHER PUBLICATIONS

Topology-Based Detection Of Anomalous BGP Messages; Christopher Kruegel, et al.; Lecture Notes in Computer Science, Springer-Berlin, vol. 2820; 2003; 20 pages.

Finding A Needle In A Haystack: Pinpointing Significant BGP Routing Changes In An IP Network; Jian Wu, et al.; In Symposium on Networked System Design and Implementation (NSDI), May 2005; 14 pages.
Observation And Analysis Of BGP Behavior Under Stress; Lan Wang, et al.; Internet Proceedings of the $2^{nd}$ ACM SIGCOMM Workshop on Internet Measurement; 2002; 13 pages.
End-To-End Routing Behavior In the Internet; Vern Paxson; IEEE/ACM Transactions on Networking, 5(5):601-615, Oct. 1997; 14 pages.
Dynamics Of Hot-Potato Routing In IP Networks; Renata Teixeira, et al.; SIGMETRICS/Performance '04, Jun. 12-16, 2004; pp. 307-318.
Modeling TCP Throughput: A Simple Model And Its Empirical Validation; Jitendra Padhye, et al.; Proc ACM SIGCOMM 1998; 12 pages.

(Continued)

*Primary Examiner* — Aesar M. Qureshi
(74) *Attorney, Agent, or Firm* — Hanley, Flight & Zimmerman, LLC

(57) ABSTRACT

A system and method for detecting and diagnosing routing problems in a network in real-time by recording TCP flow information from at least one server to at least one prefix, and observing retransmission packets communicated from the at least one server to the at least one prefix. When a predetermined threshold for TCP flows to a prefix is reached, traceroutes may be triggered to a destination in the prefix, and the traceroutes analyzed to determine whether to issue an alarm for a routing failure. The system includes a real-time data collection engine for recording unidirectional TCP flow information, a real-time detection engine for observing the retransmission packets and issuing a warning upon a retransmission counter exceeding a predetermined threshold, and a real-time diagnosis engine for triggering at least one traceroute to a destination in the prefix that is randomly selected from TCP flows in retransmission states.

15 Claims, 12 Drawing Sheets

OTHER PUBLICATIONS

Characterization Of Failures In An IP Backbone; Athina Markopoulou, et al.; INFOCOM 2004; 11 pages.

Random Early Detection Gateways For Congestion Avoidance; Sally Floyd, et al.; Aug. 1993; IEEE/ACM Transactions on Networking; 1-22 pages.

Measuring The Effects Of Internet Path Faults On Reactive Routing; Nick Feamster, et al.; SIGMETRICS'03, Jun. 10-14, 2003; 1-12 pages.

A Safe Path Vector Protocol; Timothy G. Griffin, et al.; In Proc. IEEE INFOCOM, Mar. 2000; 10 pages.

The Stable Paths Problem And Interdomain Routing; Timothy G. Griffin; et al.; IEEE/ACM Transactions On Networking; vol. 10, No. 2; Apr. 2002; pp. 232-243.

PlanetSeer: Internet Path Failure Monitoring and Characterization In Wide-Area Services; Ming Zhang, et al.; In Proc. $6^{th}$ USENIX OSDI, San Francisco, CA, Dec. 2004; pp. 167-182.

Understanding The Performance Of Many TCP Flows; Lili Qiu, et al.; Proceedings of the $7^{th}$ International Conference on Network Protocols (ICNP'99) Toronto, Canada, 1999; 24 pages.

On Network-Aware Clustering Of Web Clients; Balachander Krishnamurthy, et al.; SIGCOMM'00; Stockholm, Sweden; Copyright 2000; pp. 97-110.

Stable Internet Routing Without Global Coordination; Lixin Gao, et al.; in Proc. ACM SIGMETRICS, Jun. 2000; 11 pages.

Combining Routing And Traffic Data For Detection Of IP Forwarding Anomalies; Matthew Roughan, et al.; SIGMETRICS'04; copyright 2004; pp. 1-12.

Combining Visual And Automated Data Mining For Near-Real-Time Anomaly Detection And Analysis In BGP; Soon Tee Teoh, et al.; VizSEC/DMSEC'04, Oct. 29, 2004; 10 pages.

Internet Routing Instability; Craig Labovitz, et al.; IEEE/ACM Transactions On Networking, vol. 6, No. 5, Oct. 1998; pp. 515-528.

Experimental Study Of Internet Stability And Backbone Failures; Craig Labovitz, et al.; Fault-Tolerant Computing, Jun. 15-18, 1999. Digest of Papers—Twenty-Ninth Annual International Symposium; 8 pages.

The Impact Of Internet Policy And Topology On Delayed Routing Convergence; Craig Labovitz, et al.; IEEE INFOCOM; 2001; pp. 537-546.

Inherently Safe Backup Routing With BGP; Lixin Gao, et al.; IEEE INFOCOM; 2001; pp. 547-556.

The Temporal And Topological Characteristics Of BGP Path Changes; Di-Fa Chang, et al.; Proceedings of the 11th IEEE International Conference on Network Protocols; 2003; 10 pages.

On Understanding Of Transient Interdomain Routing Failures; Feng Wang, et al.; Technical Report TR-05-CSE-01, Department of ECE, University of Massachusetts, Amherst, Apr. 2005; 10 pages.

* cited by examiner

Table 1: The number of warnings and prefixes issued by the trigger algorithm.

|          | Oct.26 | Oct.27 | Oct.28 | Oct.29 | Oct.30 | Oct.31 | Nov.1 |
|----------|--------|--------|--------|--------|--------|--------|-------|
| warnings | 47717  | 51421  | 48835  | 47527  | 47861  | 46899  | 42245 |
| prefixes | 7041   | 7182   | 7114   | 5671   | 5315   | 7324   | 7177  |

*Fig. 13a*

Table 2: Classification of real-time alarms

| date   | number of warnings |                 |             |             | number of prefixes |                 |             |           |
|--------|--------------------|-----------------|-------------|-------------|--------------------|-----------------|-------------|-----------|
|        | unreachable loop   | forwarding loop | reachable   | unknown     | unreachable loop   | forwarding loop | reachable   | unknown   |
| Oct.26 | 6670 (14%)         | 1942 (4%)       | 38604 (81%) | 492 (1%)    | 1352 (17%)         | 721 (9%)        | 5543 (72%)  | 136 (1%)  |
| Oct.27 | 8677 (17%)         | 2424 (5%)       | 39428 (77%) | 883 (1%)    | 2060 (25%)         | 678 (8%)        | 5441 (66%)  | 114 (1%)  |
| Oct.28 | 7730 (16%)         | 2818 (6%)       | 37592 (77%) | 686 (1%)    | 1748 (21%)         | 736 (9%)        | 5542 (68%)  | 110 (2%)  |
| Oct.29 | 7012 (15%)         | 2074 (4%)       | 37712 (80%) | 720 (1%)    | 1183 (19%)         | 563 (9%)        | 4500 (71%)  | 78 (1%)   |
| Oct.30 | 6332 (13%)         | 1937 (4%)       | 39006 (82%) | 577 (1%)    | 1138 (20%)         | 526 (8%)        | 4209 (71%)  | 58 (1%)   |
| Oct.31 | 5960 (13%)         | 2340 (5%)       | 38208 (81%) | 382 (1%)    | 1712 (21%)         | 727 (9%)        | 5727 (69.5%)| 106 (0.5%)|
| Nov.01 | 5269 (12%)         | 1845 (4%)       | 34875 (83%) | 247 (1%)    | 1639 (20%)         | 659 (8%)        | 5599 (70%)  | 103 (2%)  |

*Fig. 13b*

Table 3: Unreachable warnings with IP-level path change

| date     | Oct.26     | Oct.27     | Oct.28     | Oct.29     | Oct.30     | Oct.31     | Nov.01     |
|----------|------------|------------|------------|------------|------------|------------|------------|
| warnings | 394 (16%)  | 3457 (40%) | 2307 (30%) | 1954 (28%) | 1784 (28%) | 1807 (30%) | 1029 (20%) |

*Fig. 13c*

Table 4: Location of forwarding loops

| | tier-1 ASes | edge ASes |
|---|---|---|
| warnings | 1057 (12%) | 9486 (88%) |
| prefix | 274 (11%) | 2344 (89%) |

Table 5: Location of unreachable warnings

| | tier-1 ASes | edge ASes |
|---|---|---|
| warnings | 21170 (34%) | 26480 (56%) |
| prefix | 2130 (36%) | 3751 (64%) |

SYSTEM AND METHOD FOR REAL-TIME DIAGNOSIS OF ROUTING PROBLEMS

BACKGROUND OF THE INVENTION

The present invention relates generally to networking, and more particularly, to a real-time tool for detecting and diagnosing routing problems by passive and active measurements.

As the Internet starts to carry more and more mission critical services such as Voice-over-IP (VoIP), it is imperative that network performance be maintained, and that network operators have the requisite tools to enable the quick detection and correction of failures in the control plane. Studies have demonstrated that there are many things that can negatively impact Internet routing, including misconfiguration, physical equipment failures, and cyber attacks. From a network operator's perspective, early detection of network routing problems is crucial, to enable mitigation of the same either directly or by the appropriate entity. For example, today's land-line telephone customers are accustomed to a 99.999% reliability rate. This translates into less than 6 minutes of downtime per year, which is a number far greater than the current reliability of public Internet service. As greater numbers of customers seeking to lower their telephone costs transition to VoIP, they will be faced with the reality of service interruptions, and network providers will be pressured to improve their response time in order to remain competitive. Currently, network operators primarily rely on three sources of information to detect Internet routing problems. They monitor routing protocol announcements, perform some limited active probing (mainly within their own network), and investigate customer complaints. For a variety of reasons, however, none of these approaches is sufficient to provide similar reliability to current land-line services.

Using routing announcements, it is difficult to determine the existence, location, and severity of a network outage in a timely fashion, as such announcements occur after a network outage occurs. Furthermore, since routing announcements are aggregated, even after they are collected it is difficult to determine the existence and location of a network outage. See Feldman, A., Maennel, O., Mao, Z. M., Berger, A., and Maggs, B., "Locating Internet Routing Instabilities," In *Proceedings of ACM SIGCOMM* (2004).

Active probing consumes network resources, so most network operators only perform a limited amount of active probing within their own network, and to a small number of important sites outside their network at a modest frequency. Active probing may be warranted in certain situations, such as, for example, to determine if customers reach an important Web site (e.g., Google). The costs associated with active probing can be justified in cases where a site is contacted by many customers. However, in the case of calls that are made between a pair of VoIP endpoints or with typical peer-to-peer (P2P) communications, the limited paths traversed over the Internet do not warrant the cost of frequent active probing for such applications. On the other hand, if active probing is not frequently performed, it is impossible to react quickly enough to improve network uptime.

Waiting to receive customer complains in order to detect network outages is the least preferred method from a network operator perspective. Not only does this approach hamper customer satisfaction, but the necessity for human intervention renders it is slow and expensive, and can make diagnosis difficult. Descriptions of network problems that are typically provided by customers are often incomplete and misleading. Moreover, in the case of VoIP services, a customer may not even be able to reach the network provider if the network is down.

The Transport Control Protocol (TCP) is used as a reliable transport protocol for many Internet applications. TCP recovers data from loss, duplication, or out of order delivery by assigning a sequence number to each byte transmitted and requiring an acknowledgment (ACK) from the target receiver. When using TCP, sequence numbers are employed by the receiver to correctly re-order segments and eliminate duplicates. TCP uses slow-start and congestion avoidance algorithms to control data transmission. When congestion occurs, TCP slows down the packet transmission rate, and then invokes the slow-start algorithm to initiate the recovery.

TCP detects packet loss in two ways: Retransmission Time Out (RTO) and duplicate acknowledgement ACK. If an ACK is not received within Retransmission Time Out (RTO), the TCP sender thinks the packet is lost and retransmits the data. Alternatively, upon receiving an out-of-order segment, the TCP receiver sends an immediate duplicate ACK. This informs the network that a segment was received out-of-order, and of the expected sequence number. In addition, the TCP receiver sends an immediate ACK when the incoming segment fills in all or part of a gap in the sequence. This generates more timely information for the sender recovery. The TCP sender uses a fast-retransmit algorithm to detect and repair packet loss based on incoming duplicate ACKs. After the arrival of three duplicate ACKs (four identical ACKs without the arrival of any other intervening packet), TCP performs a retransmission of what appears to be the missing segment, without waiting for the retransmission timer to expire.

In view of the foregoing, there exists a need for a methodology for diagnosing routing problems that utilizes both passive and active measurements, while limiting the amount of active probing to conserve network resources.

SUMMARY OF INVENTION

In accordance with an aspect of the invention, a system and method are provided for detecting and diagnosing routing problems in a network in real-time by recording TCP flow information from at least one server to at least one prefix, and observing retransmission packets communicated from the at least one server to the at least one prefix. When a predetermined threshold for TCP flows to a prefix is reached, traceroutes may be triggered to a destination in the prefix, and the traceroutes analyzed to determine whether to issue an alarm for a routing failure. The system includes a real-time data collection engine for recording unidirectional TCP flow information, a real-time detection engine for observing the retransmission packets and issuing a warning upon a retransmission counter exceeding a predetermined threshold, and a real-time diagnosis engine for triggering at least one traceroute to a destination in the prefix that is randomly selected from TCP flows in retransmission states.

In accordance with an aspect of the invention, a method for detecting and diagnosing routing problems comprises the steps of: recording unidirectional TCP flow information from at least one server to at least one prefix; maintaining a hash table for TCP flows for the at least one prefix, the hash table storing 4-tuple flow keys and highest sequence number observed for each TCP flow; maintaining a retransmission counter for each prefix; incrementing the retransmission counter whenever a TCP flow of a prefix changes to a retransmission state until the predetermined threshold is reached; if a TCP flow to a prefix is not in a retransmission state, resetting the retransmission counter for the prefix to zero; if a predetermined threshold for TCP flows to a prefix is reached, triggering at least one traceroute to a destination in the prefix for which the threshold has been exceed; and analyzing the at least one traceroute to determine whether to issue an alarm for a routing failure.

In accordance with another aspect of the invention, a system for detecting and diagnosing routing problems comprises: a real-time data collection engine adapted to record TCP flow information from at least one server to at least one prefix; a real-time detection engine adapted to observe retransmission packets from the at least one server to at the least one prefix, and determine if a predetermined threshold for TCP flows to the prefix is reached; and a real-time diagnosis engine adapted to trigger at least one traceroute to a destination in the prefix if the threshold is reached.

These and other advantages of the invention will be apparent to those of ordinary skill in the art by reference to the following detailed description and the accompanying drawings.

BRIEF DESCRIPTION OF THE DRAWINGS

FIG. 1b is a graph depicting the cumulative distribution of the routing failure duration for the failures depicted in FIG. 1a;

FIG. 13a is a table depicting the overall warning rate/day observed during the study period;

FIG. 13b is a table classifying each warning by category;

FIG. 13c is a table listing the percentage of unreachable warnings for different paths;

DETAILED DESCRIPTION OF THE PREFERRED EMBODIMENTS

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It should be noted that the invention is not limited to any particular software language described or implied in the figures. One of ordinary skill in the art will understand that a variety of alternative software languages may be used for implementation of the invention. It will also be understood that some components and items are illustrated and described as if they were hardware elements, as is common practice within the art. However, one of ordinary skill in the art, and based on a reading of the detailed description, would understand that in at least one embodiment, components in the method and system may be implemented in software or hardware.

Figure 1A:
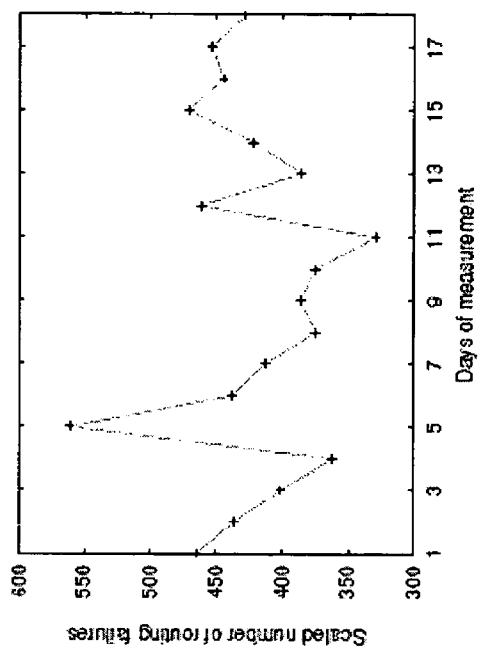
FIG. 1a is a graph depicting a scaled number of routing failures per day observed in a tier-1 ISP.
Figure 1B:
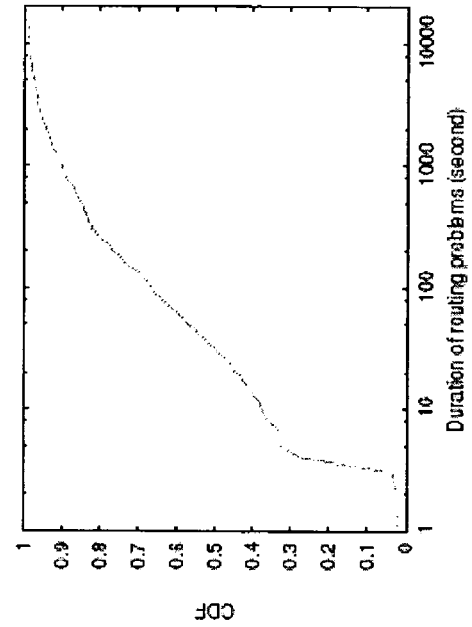

In order to motivate the need to troubleshoot network routing failures, the inventors have shown the prevalence of routing failures in a tier-1 Internet Service Provider (ISP). For a given prefix (i.e., the set of network addresses that a given route covers), a router is considered to have had a "routing failure" for the prefix if the router loses all routes to the prefix for a period of time. The time period between when the router loses and regains a route is defined as the "duration of the routing failure." Routing failures are inferred based on the Border Gateway Protocol (BGP) data obtained from the tier-1 ISP. FIG. 1(a) shows the scaled number of routing failures that were observed per day over a period of 17 days. FIG. 1(b) depicts the cumulative distribution of routing failure duration. It was found that the majority of routing failures lasted more than 10 seconds.

Figure 2:
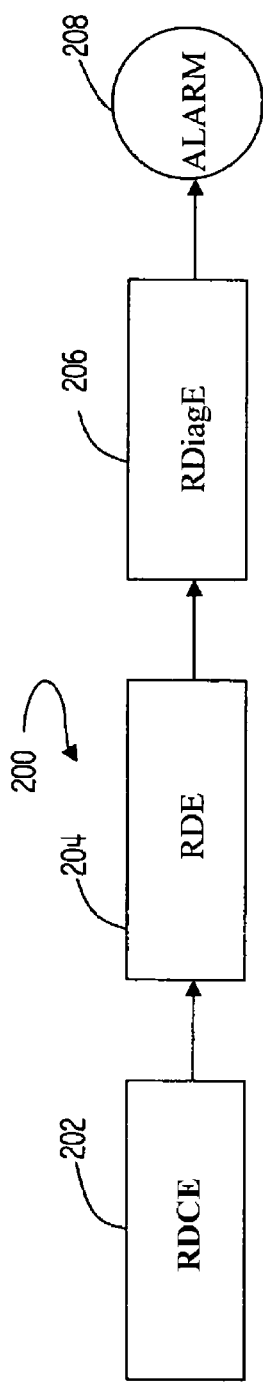
FIG. 2 is a schematic of an exemplary system architecture for a real-time diagnosis system in accordance with an aspect of the invention.
Figure 3:
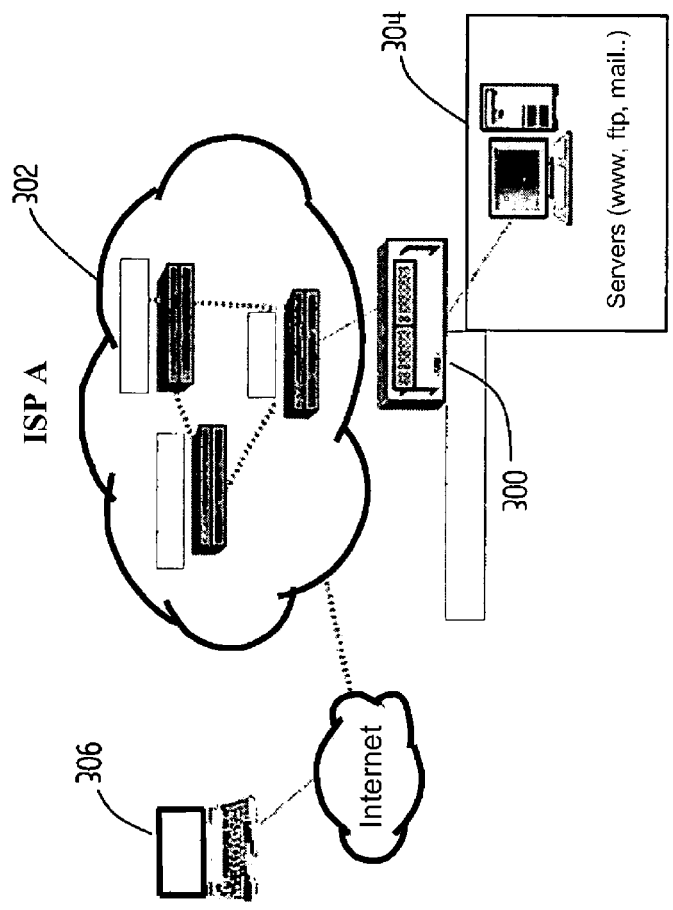
FIG. 3 is a schematic of the real-time diagnosis system deployed between servers in a large data center and an edge router for the servers.

Referring now to FIG. 2, a schematic is depicted of an exemplary system architecture of a real-time diagnosis system (RTDS) 200 in accordance with the invention that may be deployed between servers in a large data center and an edge router for the servers. All outgoing traffic from the servers traverses the RTDS 200 as illustrated in FIG. 3. FIG. 3 is a schematic depicting a RTDS 300 in an exemplary application deployed between a tier-1 ISP 302 and a plurality of servers in a large data center collectively identified by the reference numeral 304. All outgoing traffic from the servers 304 to a client 306 passes through the RTDS 300.

Referring again to FIG. 2, RTDS 200 comprises three primary components: Real-time Data Collection Engine (RDCE) 202; Real-time Detection Engine (RDE) 204; and Real-time Diagnosis Engine (RDiagE) 206. The RDE 204 determines potential routing problems by monitoring traffic and issues warnings to the RDiagE 206. The RDiagE 206 is adapted to issue an appropriate alarm represented by block 208 after determining the source of the routing problem.

The RDCE 202 records relevant TCP flow information for further analysis by the RDE 204. In accordance with an aspect of the invention, only unidirectional traffic flows are monitored. This is important since TCP flows in a data server can be asymmetric, which normally presents challenges to capturing bidirectional traffic flows. Accordingly, the real-time diagnosis system 200 only monitors outgoing traffic from a data server to a client. As will be described in more detail below, the detection algorithm takes advantage of TCP retransmission packets sent by servers to clients to detect potential routing failures. Therefore, it is unnecessary to collect ACK packets that travel in the reverse direction from clients to the servers. The RDCE 202 collects flow information using 4-tuple flow identification (i.e., srcip, destip, srcport, destport). In addition, the data collection records the highest sequence number observed in each flow.

The RDE 204 utilizes an algorithm that detects when all active flows enter a retransmission state when a routing failure occurs. Since flows will keep on retransmitting packets until routes are recovered, the RDE 204 detects potential routing problems by observing retransmission packets. In this regard, the RDE 204 correlates TCP flows that belong to the same destination prefix. In accordance with an aspect of the invention, a hash table of flows are maintained for each prefix. In the table, 4-tuple flow keys (srcip, destip, srcport, destport) and as the highest sequence number seen for each flow are stored. The RDE 204 determines potential routing failures from only unidirectional traffic flows based on observations of retransmission packets. The detection algorithm can be implemented in real-time by processing traffic flows as a data steam. A retransmission counter $P_{retran}$ is maintained for each prefix. Whenever a flow of a particular prefix changes from a "transmission" state to a "retransmission" state, the prefix's retransmission counter is incremented. If a flow of the prefix transmits a new packet (i.e., one having a higher sequence number than the one stored in the hash table), the $P_{retran}$ for that prefix is reset to zero. When the retransmission counter reaches a threshold C, a warning is issued to the RDiagE 206. An illustrative Real-time Detection Algorithm may have the following form:

Real-Time Detection Algorithm
For each sending packet
  if the packet is a retransmitted packet
    if it is a new flow entering the retransmitted state
      increment $P_{retran}$ of the prefix belonging to the destination
  Otherwise, if the packet is not a retransmitted packet
    reset $P_{retran}=0$ of the prefix belonging to the destination
  if $P_{retran} \geq$ threshold C then
    issue a warning for a routing failure The RDiagE 206 is adapted to issue a warning when C TCP flows in the same prefix are in retransmission states. After a warning is issued by RDiagE 206, the RDiagE triggers a pair of traceroutes to a destination in the prefix. As will be appreciated by those skilled in the art, Traceroute is an available utility that may be employed to troubleshoot IP connectivity. It sends out either ICMP echo request or UDP messages with gradually increasing IP low time-to-live (TTL) values to probe the path by which a packet traverses the network. The destination will return an ICMP reply, thereby indicating that the destination had been reached. A traceroute can end with one of several error indications that show why the traceroute cannot proceed. This facilitates the determination of where packets are dropped or lost, and/or if a router has no route to the target host. Dropped or lost packets on a traceroute will show as asterisks (*). "!H" (Host unreachable) indicates that the router has no route to the target. "!N" indicates that the target host's network is unreachable. "!X" (Communication administratively prohibited) indicates that the network administrator has blocked traceroute at a particular router.

The destination address for the traceroute is randomly selected from TCP flows in the retransmission states. Results from traceroutes can then be analyzed to determine if an alarm should be issued. A pair of traceroutes is sent back-to-back in order to capture transient IP-level path changes. In order to avoid flooding the target, the interval time between two consecutive pairs of traceroutes to the same prefix is limited by a given threshold.

Figure 4A:
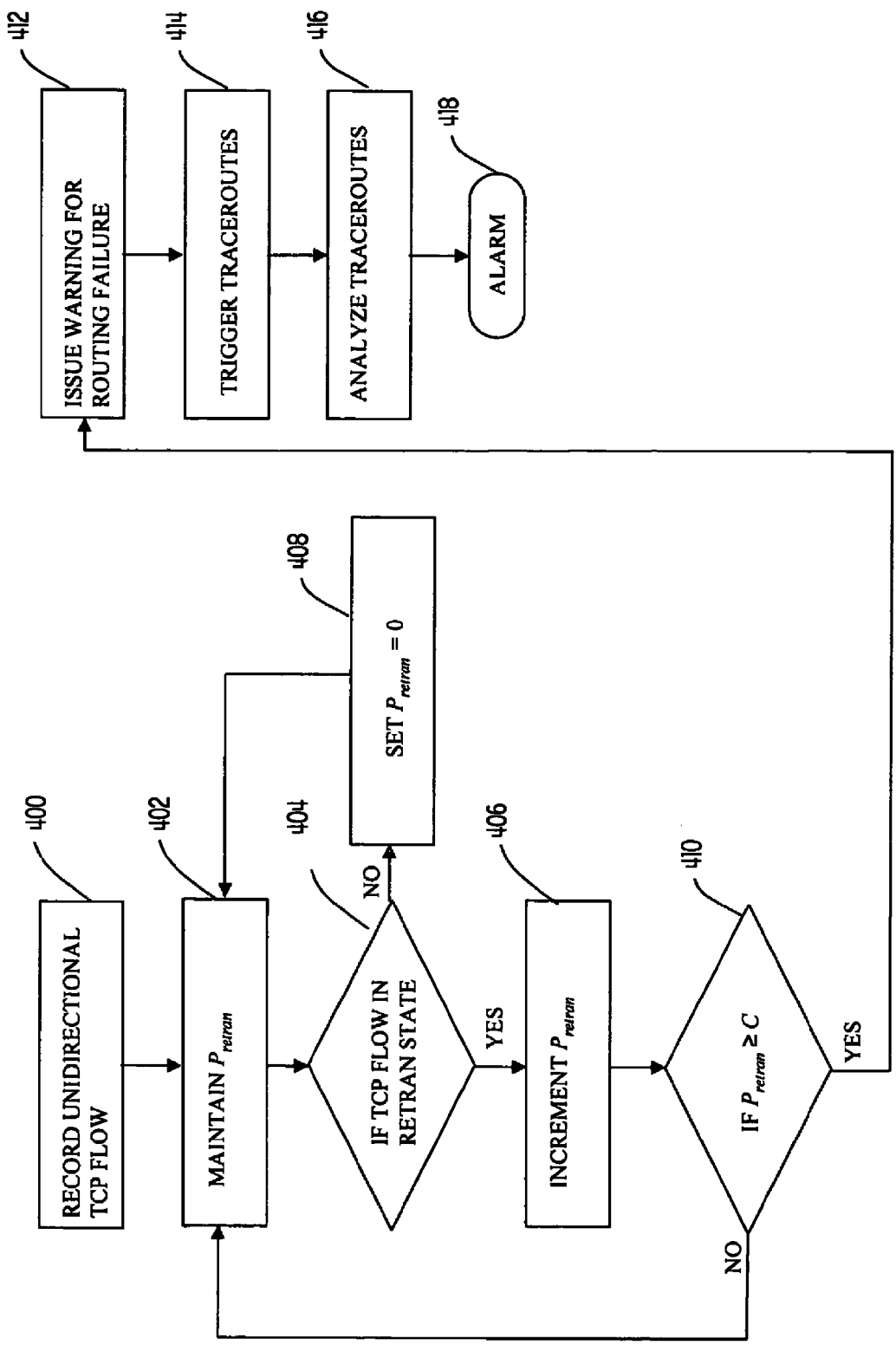
FIG. 4a is a high-level flow diagram of a method in accordance with an aspect of the invention.

FIG. 4a is a flow diagram of a method in accordance with an aspect of the present invention. At block 400, the RDCE 202 (FIG. 2) monitors unidirectional TCP flows. A hash table of packet flows are maintained for each prefix. The table stores 4-tuple flow keys and the highest sequence number observed for each flow. Block 402 depicts a retransmission counter $P_{retran}$ that is maintained for each prefix. At block 404, if a flow for a particular prefix is observed in a retransmission state, then $P_{retran}$ is incremented at block 406. If the flow is not observed in a retransmission state as indicated by a new packet having a higher sequence number than that stored in the hash table, then $P_{retran}$ is set to zero at block 408. If $P_{retran} \geq C$ at block 410, then the RDE 204 issues a warning for the routing failure at block 412. The RDiagE 206 then triggers a pair of traceroutes to a randomly selected destination in the prefix at block 414. At block 416, the traceroutes are analyzed and an alarm may be issued at block 418.

An underlying assumption about TCP is very low packet loss. Further, it is assumed that loss indicates congestion. As such, congestion control mechanisms are triggered to keep the throughput high so as to minimize the impact of packet loss. Modern TCP implementations use two mechanisms: Triple duplicated (TD) ACK and timeout (TO), to determine which packets are lost in the network. Triple duplicated ACK is effective for a small fraction of packet losses, while a timeout mechanism is necessary to capture larger packet losses and various border cases. A TCP flow can experience retransmission timeout several times from a single packet loss. The retransmission timeout is increased when a packet is retransmitted. This is called a "backoff" process. In an exponential backoff process, the next timeout doubles the previous timeout. We define the duration of the sequence of retransmissions as a "retransmission delay." On the other hand, packet loss can be manifested in a variety of ways. An example is packet loss that can arise due to routing failures. In accordance with another aspect of the invention, the following heuristic may be utilized to trigger active probes:

(1) Monitor all retransmissions of active flows to a prefix,
  (a) if retransmissions of all flows belonging to the prefix last longer than $T_{ret}$ where $T_{ret}$ is a threshold for retransmission delay, and
  (b) all active flows belonging to the prefix simultaneously experience packet retransmissions.
(2) Trigger active probes to the prefix, if none of the active flows are recovered (i.e., the retransmission packets are successful) within $T_{recover}$ seconds, where $T_{recover}$ is a threshold for the recovery duration.

In step 1(a), all subsequent analysis assumes that routing failures are long enough to permit active probings to detect those failures. These routing failures as prolonged routing failures. During prolonged routing failures, a TCP flow will experience multiple consecutive timeouts. Thus, multiple consecutive timeouts might represent a possible routing failure. The threshold $T_{ret}$ is used to predict whether a packet retransmission might have one or multiple timeouts as soon as possible.

In step 1(b), if there are multiple active flows belonging to the same prefix, and a routing failure impacts the prefix, all active flows simultaneously experience packet losses. If any active flow does not enter retransmission, these retransmissions are not due to routing failures. The RDE 204 uses packet retransmission, including TD ACK and timeout, as an indicator of a possible routing failure. When a packet loss indicated by TD, the duration of the retransmission delay is much shorter than the initial timeout for which the minimum value ranges from 200 ms to 1 second. Thus, packet retransmissions due to TD can quickly recover from packet loss by only one retransmission. In order to discard retransmissions with a single backoff, active flows are monitored to ensure that the retransmitted flow does not recover from failures by one retransmission when active probes are sent. The delayed probing can wait for $T_{recover}$ seconds to make sure that the retransmitted packet is indeed lost.

Figure 4B:
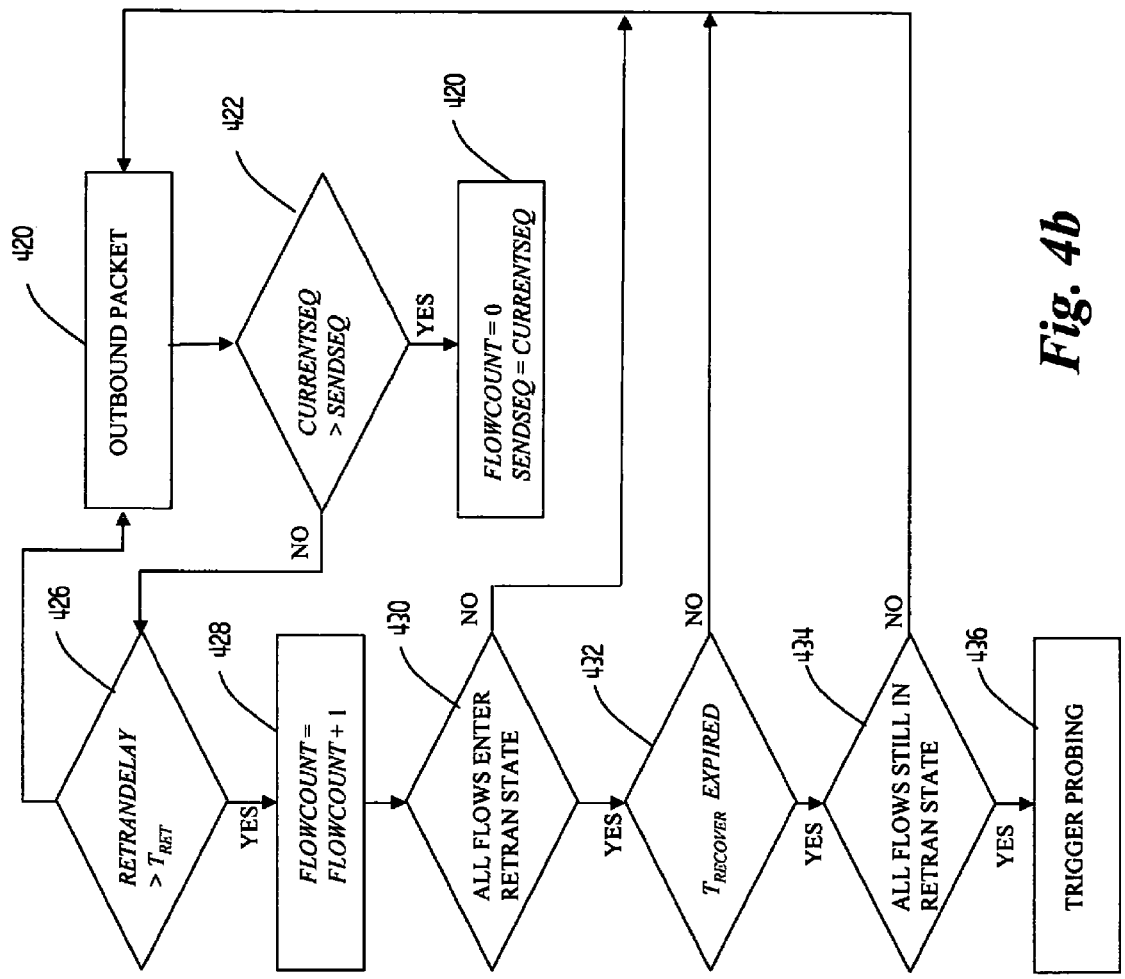
FIG. 4b is a high-level flow diagram of another method in accordance with an aspect of the invention.

FIG. 4b is a flow diagram of a method in accordance with another aspect of the invention, utilizing the heuristic described above to trigger active probes. To detect packet retransmissions when the RDE 204 is on the sender side, several variables are maintained: sendseq, retrandelay, and flowcount for each flow. Variable sendseq is the sequence number of the most recently sent new packet. Variable retrandelay is the duration of a packet retransmission. Variable flowcount represents a counter to record the number of flows entering the retransmission state. Currentseq represents the sequence number of the packet currently being sent at block 420. If Currentseq>sendseq at block 422, the flow is making progress and the following are set at block 424: flowcount and retrandelay=0, and sendseq=currentseq. If retrandelay>$T_{ret}$ at block 426, the packet is retransmitted and flowcount is incremented at 428. The RDCE 202 keeps track of the first sending time of each packet. If the current packet is retransmitted, retrandelay is derived by the difference between the current retransmission time and the stored first transmitted time. If all flows enter the retransmission state at block 430, Trecover expires at block 432, and all flows are still in the retransmission state at block 434, then active probing is triggered at block 436.

Figure 5:
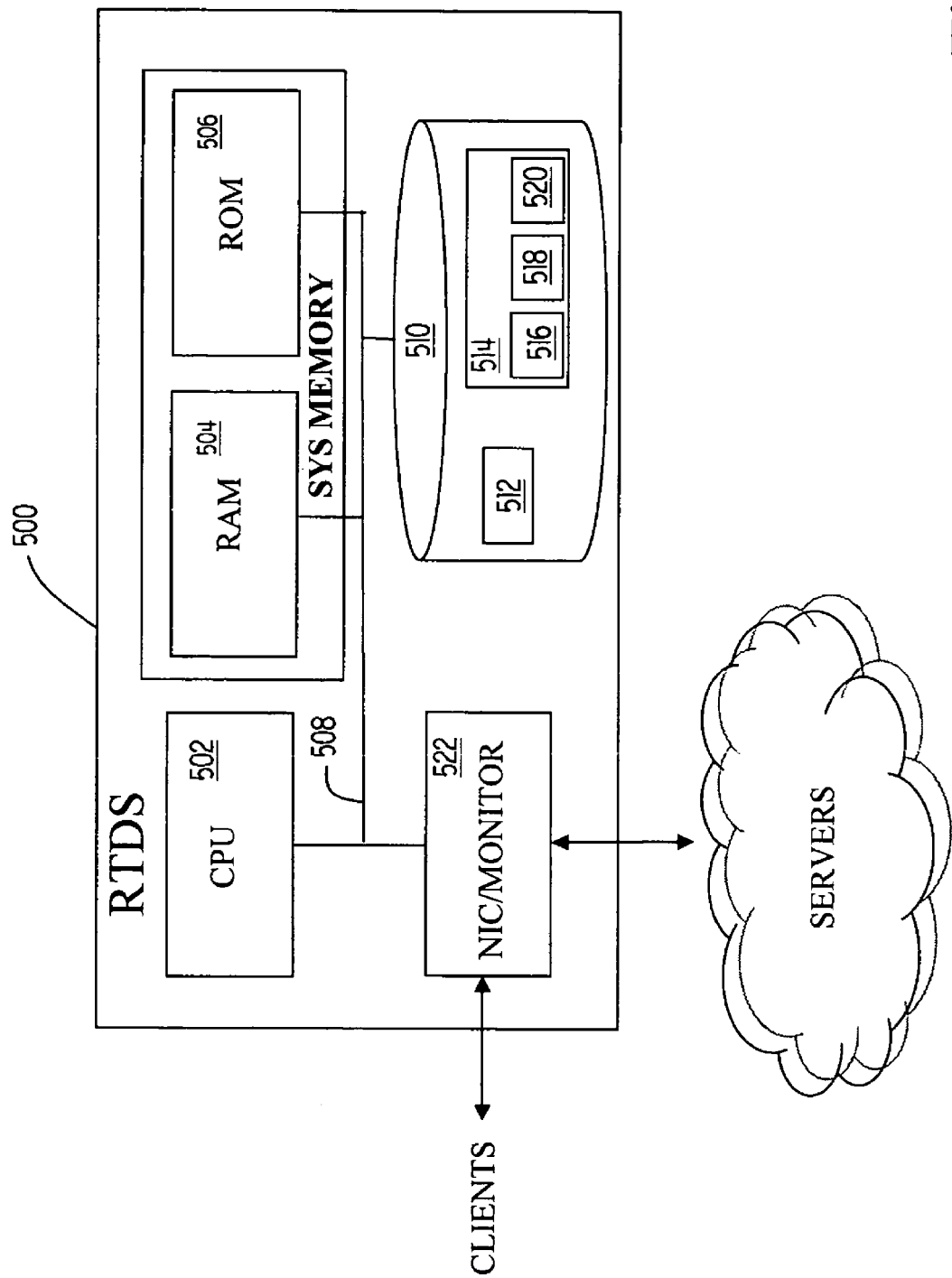
FIG. 5 is a schematic of an illustrative server for carrying out aspects of the invention.

FIG. 5 is a schematic of an exemplary RTDS 500 for carrying out aspects of the invention. The RTDS 500 is a server comprising a central processing unit CPU 502 coupled to system memory including random access memory (RAM) 504 and read only memory (ROM) 506 via a system bus 508. The RTDS further contains mass storage 510 for storing an operating system 512 and application programs 514 for implementing the functionality of the RTDS 500. The application programs 514 may include the appropriate modules for implementing an RDCE 516, RDE 518 and RDiagE 520 (corresponding to 202, 204 and 206 in FIG. 2) as described above. The CPU 502 communicates with a network monitoring card and interface 522 via system bus 508. The network monitoring card 518 may is adapted to provide network packet capture on a plurality of independent ports. An exemplary RTDS 500 that was employed in experimentation by the inventors as described below utilized an Endace Dag4.3GE monitoring card, installed on a Dell 2650 server comprising dual 2.8 Ghz Pentium IV processors running FreeBSD 4.9. It will be appreciated by those skilled in the art that the RTDS 500 may be implemented on any type of computer containing a combination of hardware, software and/or firmware, capable of carrying out the functions of the RDCE 516, RDE 518 and RDiagE 520.

Experimentation has validated the detection methodology in accordance with the invention using data collected from a tier-1 ISP. In addition, a threshold C for real-time diagnosis was determined in the course of the experimentation. In this connection, data was collected within an ISP network that hosts more than 30,000 Web sites on a large number of servers. The servers primarily support Web content, but also provide e-mail, FTP, streaming and other similar services. Traffic volume over 800 Mbit/sec was examined. Specifically, the outgoing traffic was monitored by an RTDS 500 as described above and illustrated in FIG. 5. All outgoing TCP traffic was collected during three different time periods spanning Sep. 25-30, Oct. 7-20, and Oct. 26-Nov. 1, 2005. The methodology described in the foregoing was applied to evaluate the following system characteristics: (1) false negatives; (2) detection overhead; and (3) Inter-arrival time of warning.

The false negative is illustrated by correlating BGP events. In this regard, there is a BGP event that affects network traffic without raising an alarm. During testing, BGP updates were collected from a single back-bone router through which outgoing traffic was communicated from the data servers to the network. Since there are two types of BGP updates, announcements and withdrawals, the withdrawal messages were selected for the correlation as a BGP withdrawal represents the backbone router losing its routes. However, it will be appreciated that a routing failure can be represented as an explicit withdrawal or a set of announcements (i.e., implicit withdrawal) in BGP. Thus, the number of selected BGP events defines a lower boundary of potential outages.

After selecting BGP withdrawal events, the issue of whether these BGP events affected the outgoing traffic flows was investigated. BGP withdrawals were correlated with traffic flows with a 1-minute time window. Subsequently, those events that did not affect any flow were filtered out. Additionally, for each event, the number of flows that were potentially affected was known, and this was used to correlate with alarms.

Any flows that correlated with BGP events but never experienced a retransmission were filtered out. If a prefix has a supernet, traffic can be routed by the supernet without retransmission. Those BGP events that affected TCP flows were derived, and each BGP event was correlated with alarms with the 1-minute time window. The number of flows, therefore, that may be potentially affected by a BGP event should be no less than the threshold chosen for the algorithm employed by the RDE 204 such that an alarm is issued when more than C flows experience retransmission. If a BGP event affects less than C flows, the RDE 204 cannot detect it.

Figure 6:
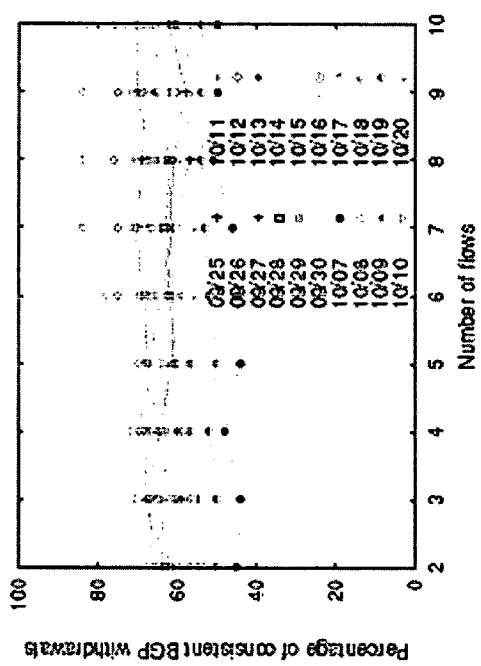
FIG. 6 is a graph depicting the percentage of consistent BGP withdrawals vs. number of traffic flows that were observed during a study period.

FIG. 6 is a graphical depiction of the percentage of consistent BGP withdrawals that were detected vs. the number of traffic flows during the study period. It was observed that more than 60% of BGP events were detected if C was set to 4. In addition, it was found that if the threshold C increases, the false negatives decrease.

Figure 7:
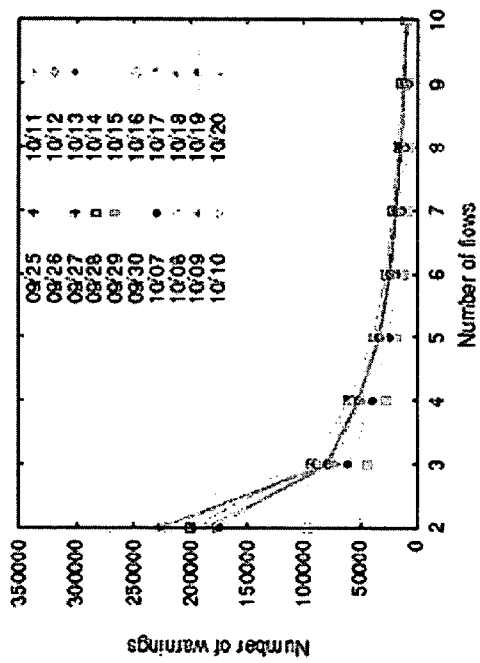
FIG. 7 is a graph depicting the number of alarms connected with routing failures as a function of varying a TCP flow retransmission threshold.

Detection overhead evaluates the number of alarms issued as C is varied. FIG. 7 is a graphical illustration depicting the number of alarms as a function of varying the threshold C from 2 to 10. During experimentation, there were in excess of 150,000 alarms for C=2. As the threshold was increased, the number of alarms significantly dropped. For example, for C=4, approximately 50,000 alarms issued. For values of C>7, the number of alarms does not significantly increase.

Figure 8B:
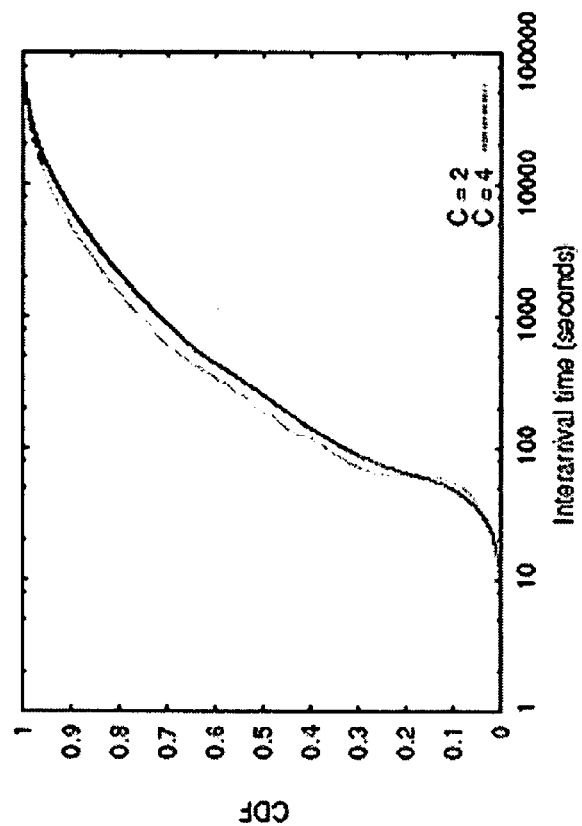
FIG. 8b is a graph similar to FIG. 8a for those warnings with the same prefixes.
Figure 8A:
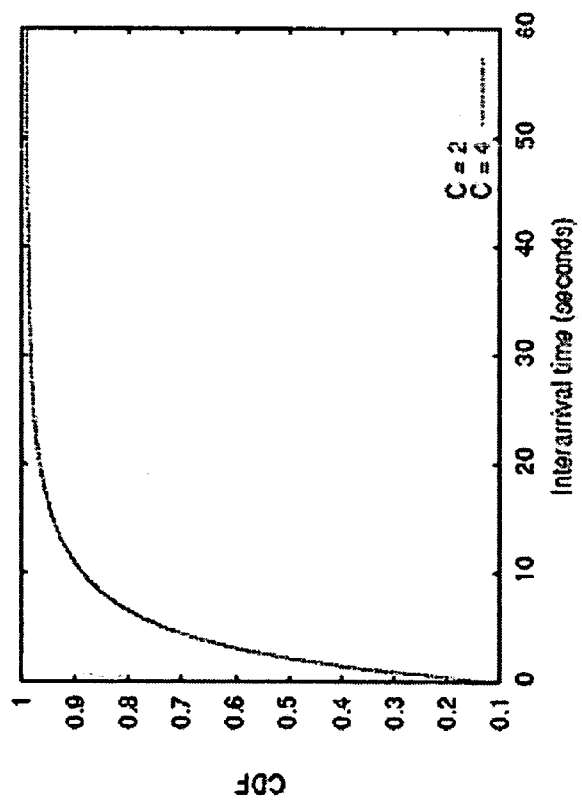
FIG. 8a is a graph of overall warnings expressed as a cumulative distribution function vs. inter-arrival time.

The inter-arrival time is a measure of how frequently alarms are generated. An alarm is generated when more than C flows are in the retransmission state as described above. FIG. 8a is a graph of the overall warnings expressed as cumulative distribution function (CDF) vs. inter-arrival time for threshold settings of C=2 and C=4. FIG. 8b is a similar depiction for those warnings with the same prefixes using the identical threshold settings. In FIG. 8a, it can be seen that the inter-arrival time for the majority of warnings is around 1 sec. for C=2. When the threshold was increased to C=4, the inter-arrival time was about 3 seconds for half of the warnings. As demonstrated by FIG. 8b, for those warnings with the same prefixes the difference between the inter-arrival time for C=2 or C=4 is small, and the inter-arrival time itself is in excess of 100 seconds for half of the prefixes. This demonstrates that a selected threshold of C=4 can significantly decrease the warning rate in a real-time diagnosis system.

Figure 9:
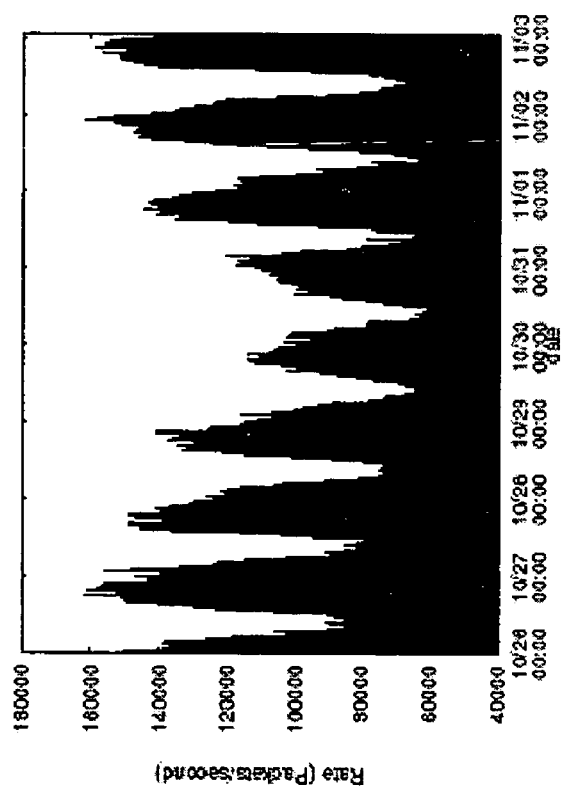
FIG. 9 is a graph depicting loads on monitored links during the study period.

The experiment was implemented by employing the above described Real-time Detection Algorithm as a module within a Gigascope high speed traffic monitor. Gigascope was developed by the Assignee of the present invention. See Cranor, C., Johnson, T., Spatscheck, O., and Shkapenyuk, V., Gigascope: "A Stream Database for Network Applications," In *Proc. of ACM SIGMOD* Conf. 2003 (San Diego, Calif., June 2003). After the algorithm triggered a warning, a pair of back-to-back traceroutes were issued to the IP address of the last connection for which concurrent retransmission was observed. As explained below, running the traceroutes in this fashion enables the capture of certain transient routing changes. In accordance with the foregoing, a threshold of C=4 was chosen, which means that a warning is generated if four connections are retransmitting data for a given prefix while no connection for this prefix makes progress. To avoid flooding a particular prefix with a large number of traceroutes, one pair of traceroutes was triggered every 5 minutes. In addition, the overall number of concurrent traceroutes was limited to 500 to avoid overloading the system and any neighboring routers. However, this limit was never reached during the experiment. Each traceroute probed the network with TTLs ranging from 2 to 16, therefore enabling the discovery of routing issues which were at least 2 hops and at most 16 hops away from the test monitor. Each hop was probed once in each traceroute, and a 2-second timeout was used for non-responding hops. This implementation was deployed on one of multiple GETH links from a data center between Oct. 26 and Nov. 1, 2005. FIG. 9 depicts the load on the links that were monitored during the evaluation period. It can be seen that the link load reached in excess of 160,000 packets per second, and a clear daily and weekly cycle is evident.

Figure 10:
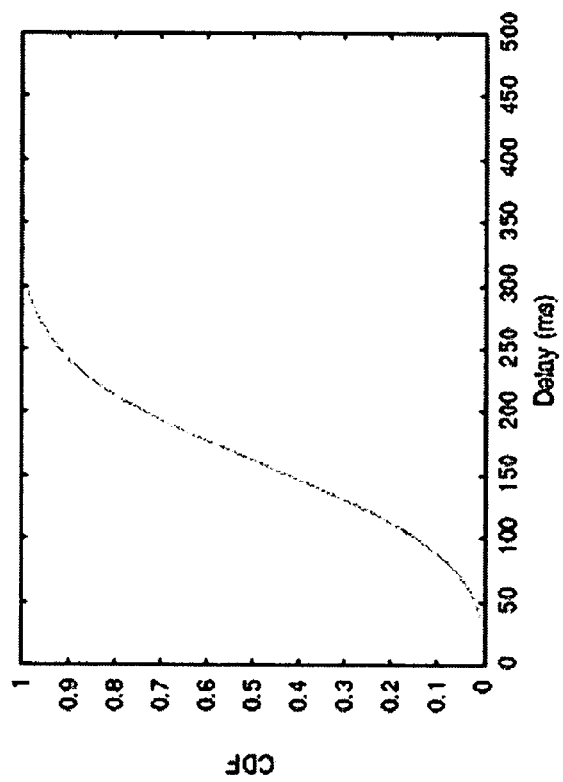
FIG. 10 is a graph depicting the trigger delay of traceroute invocation during the study period.

The amount of time it took to trigger a traceroute after generation of a warning was measured by recording a timestamp of the retransmission, which is responsible for triggering the alarm, as well as the time right before the traceroute was executed (after a new process has been forked). The packet timestamp is assigned on the Endace line card in hardware. This enabled the capture of all hardware, operating system and application delays on Gigascope. FIG. 10 is a graph of the trigger delay of traceroute invocation, showing that in excess of than 99% of all traceroutes were triggered within less than 300 mB, and all were triggered within less than 500 mB.

Figure 11:
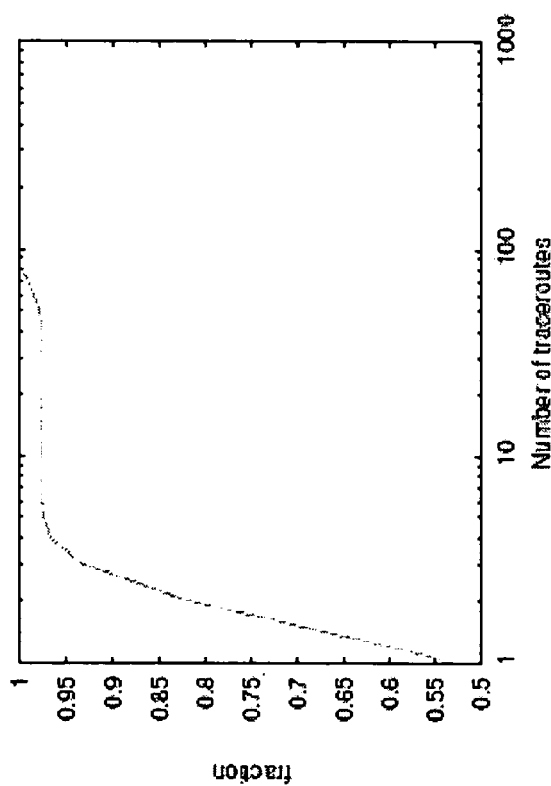
FIG. 11 is a graph of concurrent traceroutes in 1-minute bins.

FIG. 11 depicts the cumulative distribution of the number of concurrent traceroutes within each one minute bin. As can be seen, in 96% of the 1-minute bins, less than 4 traceroutes were running, which is a negligible load. Even the most busy one minute bin had less than 100 traceroutes, which is 20% of the set limit of 500 concurrent traceroutes. Therefore, the number of concurrent traceroutes during the experiment was never rate limited.

Figure 12:
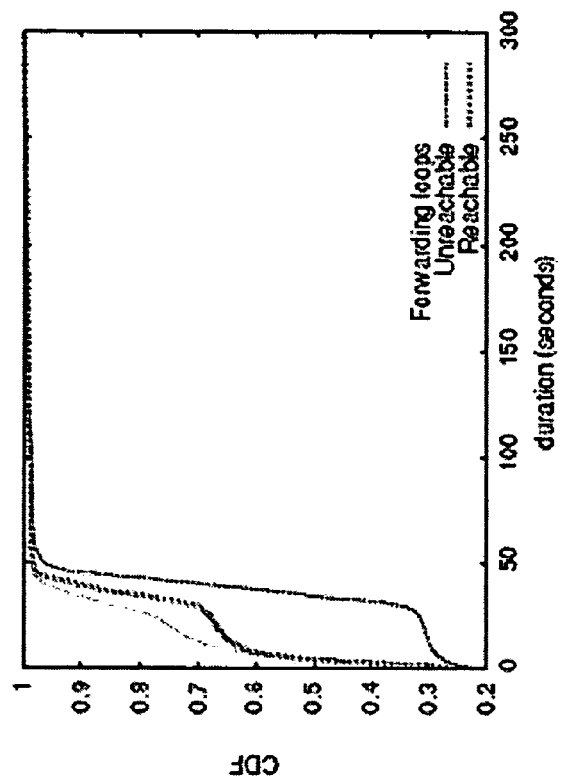
FIG. 12 is graph of the cumulative distribution of the durations of all traceroutes segregated into reachable targets, unreachable targets, and forwarding loops.

FIG. 12 depicts the cumulative distribution of the durations of all traceroutes. The traceroutes were segregated into those which reached their target, never reached their target and ended in a forwarding loop. As shown, approximately 30% of unreachable traceroutes lasted at most 30 seconds, while 68% and 78% of the traceroutes which never reached the target or ended in forwarding loops lasted up to 30 seconds. The delay difference can be explained by considering that for traceroutes which didn't reach their target, the delay was the result of probing up to 16 hops with a 2-second timeout. A traceroute that indicated a forwarding loop was characterized as either a transient or permanent loop. A forwarding loop was considered permanent if it lasted for more than an hour. A "reachable target" was defined as capturing all traceroutes which reached the AS of the target IP address. This relaxed definition of reachability accounted for the fact that a large number of hosts were not reachable due to firewalls and network address translation (NAT) boxes, even if no routing problem was present. An "unreachable target" was defined as those traceroutes associated with a warning that did not reach the AS of the target IP address. A warning was considered "unknown" if the associated traceroute was filtered, as indicated by a !X in the traceroute. Less than 2% of the warnings were in this category.

FIG. 13a is a table depicting the overall warning rate/day that was observed during the experimentation. The warning rates ranged from 47K-52K/day, impacting between 5,315 to 7,182 prefixes out of a total of 57,716 monitored prefixes. FIG. 13b is a table that classifies each warning by the categories described above. In analyzing the results, it is clear that the number of reachable targets was relatively high (more than 77% of the warnings and 66% of the prefixes). However, this was demonstrated not to pose a serious issue as a warning is only used to trigger an automated traceroute, and only a modest amount of traceroutes are required as discussed above.

FIG. 13c is a table listing the percentage of unreachable warnings for which different paths in back-to-back traceroutes were observed. To determine whether a warning should be classified as unreachable because of filtering or firewall issues, or if the warning truly presents a routing issue, a pair of back-to-back traceroutes were executed for each warning. If the hops of both traceroutes match, it is still difficult to ascertain whether the warning is filtering or routing related. However, if the traceroutes don't match, a routing reconvergence event is likely and that is indicative of a true routing problem.

The most reliable indicator of a routing event is the detection of a routing loop. This was detected in 12 to 15% of all warnings and 17 to 25% of all prefixes for which warnings were observed. In absolute numerical terms, routing problems were detected for 1,638 to 2,060 prefixes per day. The analysis was triggered using the threshold C=4 as described above (i.e., at least 4 concurrent connections have been impaired).

Figures 13D, 13E, 14:
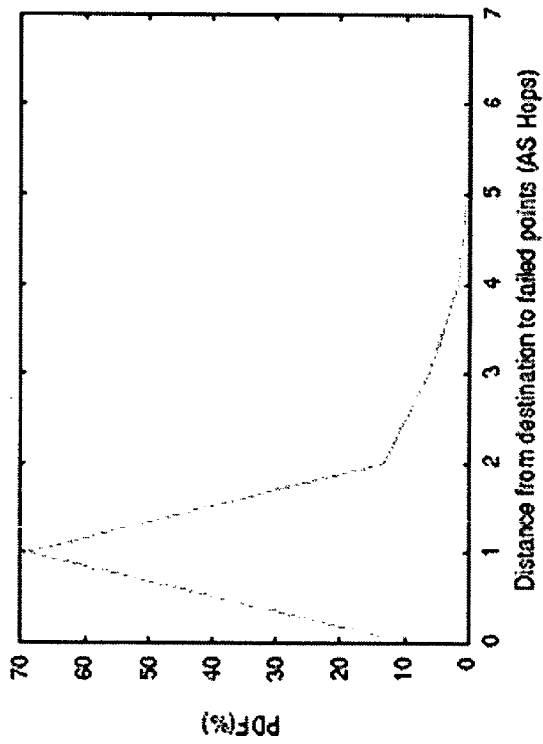
FIG. 13d is a table showing the split between tier-1 ASes and edge ASes.
FIG. 13e is a table showing the split for unreachable warnings.
FIG. 14 is a graph plotting the distance from the target IP address of the traceroute to the failure point in terms of AS hop counts.

Warnings can occur in both core (i.e., tier-1 ISPs) and access networks. Since routing issues in the core networks can potentially affect a greater number of customers than those in the access networks, they must be mitigated more quickly. The experiment focused on the location of transient forwarding loops based on the likelihood that they are indicative of real routing problems. These are the most difficult to detect within the control plane of the network. With reference to FIG. 13d, a table is depicted which illustrates the split between transient routing loops in tier-1 ISPs and the edge AS's. As can be seen, 12% of the routing loop warnings and 11% of the prefixes with routing loops were in tier-1 ISPs. Transient forwarding loops account for 71% of the overall number of forwarding loop warnings. This supports the conclusion that even though the majority of routing loops appear to occur in the access networks, an appreciable amount occur in tier-1 ISPs. FIG. 13e is a table showing the same analysis for unreachable warnings. A substantial portion of these occur in tier-1 ISPs (34% of the warnings and 36% of the prefixes).

FIG. 14 is a plot of the distance from the target IP address of the traceroute to the failure point of the traceroute in terms of AS hop counts using the routing tables prior to warning issuance, to determine the AS path. Employing this metric, it was found that even though a substantial percentage of unreachable warnings terminate with tier-1 ISPs, nearly 70% of all unreachable warnings terminate within one AS hop from the target of the traceroute. This is possibly an indication that the majority of those warnings are caused by customers who are disconnected from their tier-1 ISP.

Figure 15C:
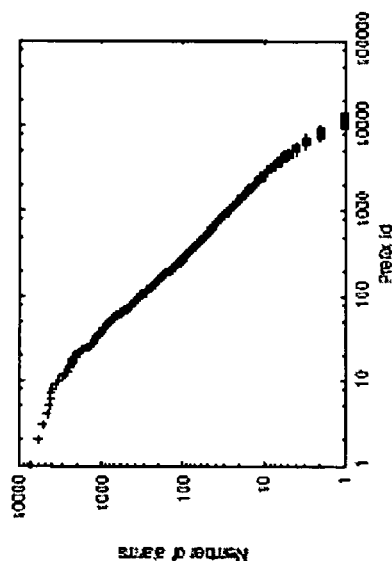
FIG. 15c is a graph showing the number of alarms vs. prefix ID for reachable warnings.
Figure 15B:
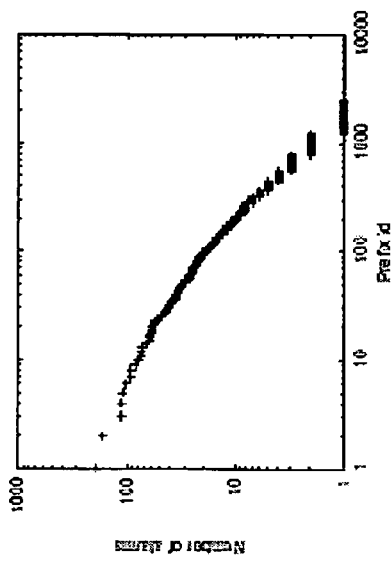
FIG. 15b is a graph showing the number of alarms vs. prefix ID for forwarding loop warnings.
Figure 15A:
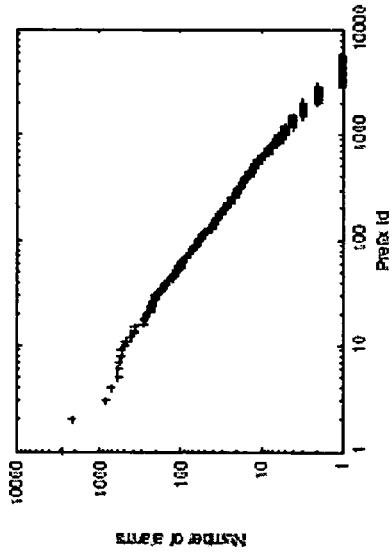
FIG. 15a is a graph showing the number of alarms vs. prefix ID for unreachable warnings.

FIGS. 15a, 15b, and 15c depict the number of warnings contributed by each prefix for each major warning category—unreachable warnings, forwarding loop warnings, and reachable warnings, respectively. The prefixes are sorted from high to low, with the prefix having the most warnings receiving a prefix ID of 1 for each graph. These graphs indicate that a few prefixes substantially contribute to the number of overall warnings. In the case of forwarding loops, 29% of all warnings in this category identify a permanent routing loop with a dwell time of over 1 hour. Considering the execution of 1 back-to-back traceroute pair every 5 minutes for each prefix, a permanent routing loop could generate a warning every 5 minutes.

Using the setting C=4 as described above (i.e., when 4 TCP connections that were actively retransmitting), the duration of these routing loops is caused by endpoints attempting to establish new TCP connections. In such a scenario, a client might attempt to contact a server in a data center by sending a SYN packet and then retransmitting the same after a timeout. The SYN packets arrive at the server and trigger SYN/ACK packets. These were observed by Gigascope and were dropped in the routing loop. If 4 such clients exist concurrently, then another traceroute pair would be triggered, which is what was observed for permanent routing loops. This supports the conclusion that permanent routing loops create unidirectional routing problems (note, the SYN packet has to reach the servers to trigger the traceroutes). In addition, there were clients that were actually trying to connect to those servers notwithstanding failure to do so for long periods of time. It will also be apparent to those skilled in the art and with reference to FIGS. 15a, 15b and 15c, that some prefixes triggered a large number of warnings in which the traceroute reached its target. This may be attributable to poor connectivity to those prefixes, thus increasing the chance of four connections retransmitting simultaneously, or it could be a function of the traffic volume carried over these prefixes.

In order to investigate how many of the observed warnings were visible in the control plane, the forwarding loops were correlated with all BGP updates. Specifically, a BGP update was considered to be related if it covered a prefix for which a warning was generated in the same minute. Using this definition, 1,412 BGP events were correlated with the warnings, of which 838 events correlated with unreachable warnings, and 574 with forwarding-loop warnings. This illustrates in particular with regard to forwarding loops, that a substantially greater number of routing events can be detected than those visible to BGP.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations which, although not explicitly shown or described herein, embody the principles of the invention and are within their spirit and scope.

We claim:

1. A method for detecting and diagnosing routing problems in a network in real-time, comprising:
    recording TCP (Transport Control Protocol) flow information from at least one server to a first prefix in a table, the table identifying TCP flows for the first prefix and a highest sequence number observed for each of the TCP flows;
    incrementing a retransmission counter for the first prefix whenever one of the TCP flows associated with the first prefix changes to a retransmission state;
    when the retransmission counter reaches a threshold, triggering at least one traceroute to a destination in the first prefix; and
    in response to receiving a packet having a sequence number higher than the highest sequence number in the table for a first TCP flow, determining that the first TCP flow is not in a retransmission state and resetting the retransmission counter to zero.

2. The method recited in claim 1, further comprising analyzing the at least one traceroute to determine whether to issue an alarm for a routing failure.

3. The method recited in claim 2, further comprising storing 4-tuple flow keys in the table.

4. The method recited in claim 1, wherein the at least one traceroute comprises a pair of traceroutes triggered to a destination in the first prefix.

5. The method recited in claim 4, wherein the destination is randomly selected from TCP flows in retransmission states.

6. The method recited in claim 4, further comprising conveying the pair of traceroutes back-to-back to the destination in the first prefix.

7. The method recited in claim 1, wherein the recorded TCP flow information is unidirectional.

8. A computer readable tangible medium having instructions stored thereon that, when executed, cause a machine to at least:
    record unidirectional TCP (Transport Control Protocol) flow information from at least one server to a first prefix in
    a table, the table identifying TCP flows for the first prefix and a highest sequence number observed for each of the TCP flows in the table;
    increment a retransmission counter for the first prefix whenever one of the TCP flows associated with the first prefix changes to a retransmission state;
    in response to receiving a packet having a sequence number higher than the highest sequence number in the table for a first TCP flow, determine that the first TCP flow is not in a retransmission state and resetting the retransmission counter to zero; and
    when the retransmission counter reaches a threshold, trigger at least one traceroute to a destination in the first prefix.

9. A system for detecting and diagnosing routing problems in a network in real-time, the system comprising:
- a data collection engine to record TCP (Transport Control Protocol) flow information from at least one server to a first prefix in a table, the table identifying TCP flows for the first prefix and a highest sequence number observed for each of the TCP flows;
- a detection engine to increment a retransmission counter for the first prefix whenever one of the TCP flows associated with the first prefix changes to a retransmission state, and, in response to an indication that any TCP flow of the first prefix has left the retransmission state, to determine that the first TCP flow is not in a retransmission state and to reset the retransmission counter to zero; and
- a diagnosis engine to, when the retransmission counter reaches a threshold, trigger at least one traceroute to a destination in the first prefix.

10. The system recited in claim 9, wherein the collection engine is to monitor unidirectional TCP flow information.

11. The system recited in claim 9, wherein the diagnosis engine is to analyze the at least one traceroute to determine whether to issue an alarm for a routing failure.

12. The system recited in claim 9, wherein the detection engine is to store 4-tuple flow keys in the table.

13. The system recited in claim 9, wherein the diagnosis engine is to trigger a pair of traceroutes to a destination in the first prefix.

14. The system recited in-claim 13, wherein the destination is randomly selected from TCP flows in retransmission states.

15. The system recited in claim 13, wherein the diagnosis engine is to convey the pair of traceroutes back-to-back to the destination in the first prefix.

* * * * *